United States Patent [19]
Hester

[11] Patent Number: 6,009,980
[45] Date of Patent: Jan. 4, 2000

[54] DUCTILE IRON VEHICLE HUB AND METHOD FOR PRODUCING SAME

[75] Inventor: Larry B. Hester, Dayton, Ohio

[73] Assignee: Meritor Automotive, Inc., Troy, Mich.

[21] Appl. No.: 08/842,562

[22] Filed: Apr. 15, 1997

Related U.S. Application Data

[60] Provisional application No. 60/015,761, Apr. 16, 1996.

[51] Int. Cl.$^7$ ...................................................... B60T 8/60
[52] U.S. Cl. .................. 188/18 R; 188/18 A; 188/218 R
[58] Field of Search ................................ 188/18 A, 18 R, 188/206 A, 206 R, 218 A, 218 R, 218 XL; 301/6.8

[56] References Cited

U.S. PATENT DOCUMENTS

| | | | |
|---|---|---|---|
| 4,132,293 | 1/1979 | Jovick | 188/181 R |
| 5,067,597 | 11/1991 | Young | 188/181 R |
| 5,193,375 | 3/1993 | Meister | 188/218 R |
| 5,263,900 | 11/1993 | Stimson | 188/18 A |
| 5,350,041 | 9/1994 | Steele et al. | 188/218 R |
| 5,352,305 | 10/1994 | Hester | 148/581 |
| 5,772,285 | 6/1998 | Bigley et al. | 301/6.8 |

*Primary Examiner*—Chris Schwartz
*Attorney, Agent, or Firm*—Howard & Howard

[57] ABSTRACT

An improved ductile iron vehicle hub and method for producing the same wherein the method includes the steps of (a) providing a vehicle hub formed from ductile iron and including a generally axially extending body having a centrally located opening formed therethrough, the body including an open inner end, an open outer end, and a generally radially outwardly extending flange; and (b) shot peening selected outer surfaces of the body of the vehicle hub to induce compressive stresses therein to improve the fatigue life the vehicle hub.

12 Claims, 5 Drawing Sheets

DUCTILE IRON VEHICLE HUB AND METHOD FOR PRODUCING SAME

CROSS-REFERENCE TO RELATED APPLICATIONS

This application claims the benefit of U.S. Provisional Application No. 60/015,761, filed Apr. 16, 1996.

BACKGROUND OF THE INVENTION

This invention relates in general to vehicle hubs and in particular to an improved ductile iron vehicle hub and method for producing the same. A typical vehicle hub is formed from either ductile iron or aluminum. A ductile iron hub has increased tensile and yield strengths compared to those of an aluminum hub. However, the weight of the ductile iron hub is substantially greater than that of a similar sized aluminum hub. In order to reduce the weight of a ductile iron hub, it is known to subject the ductile iron hub to an austempering heat treatment process. While the cost of an austempered ductile iron hub is comparable to that of an aluminum hub, the austempering heat treatment process increases the costs of the austempered ductile iron hub compared to that of a conventional ductile iron hub.

The tensile and yield strengths of an aluminum hub are not as great as that of a similar sized conventional or austempered ductile iron hub. As a result, thicker sections are required in an aluminum hub compared to that in a ductile iron hub, especially compared to that in an austempered ductile iron hub. Unfortunately, the thicker sections in the aluminum hub take up more space and therefore, leave less space for certain components of the vehicle, such as the vehicle brake assembly. Thus, it would be desirable to provide a improved ductile iron hub and method for producing such a hub which is comparable in weight to a similar sized aluminum hub and/or austempered ductile iron hub, less expensive to manufacture compared to a similar sized austempered ductile iron hub, and has tensile and yields strengths which are similar to those of a similar sized austempered ductile iron hub.

SUMMARY OF THE INVENTION

This invention relates to an improved ductile iron vehicle hub and method for producing the same. The method includes the steps of (a) providing a vehicle hub formed from ductile iron and including a generally axially extending body having a centrally located opening formed therethrough, the body including an open inner end, an open outer end, and a generally radially outwardly extending flange; and (b) shot peening selected outer surfaces of the body of the vehicle hub to induce compressive stresses therein to improve the fatigue life the vehicle hub.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
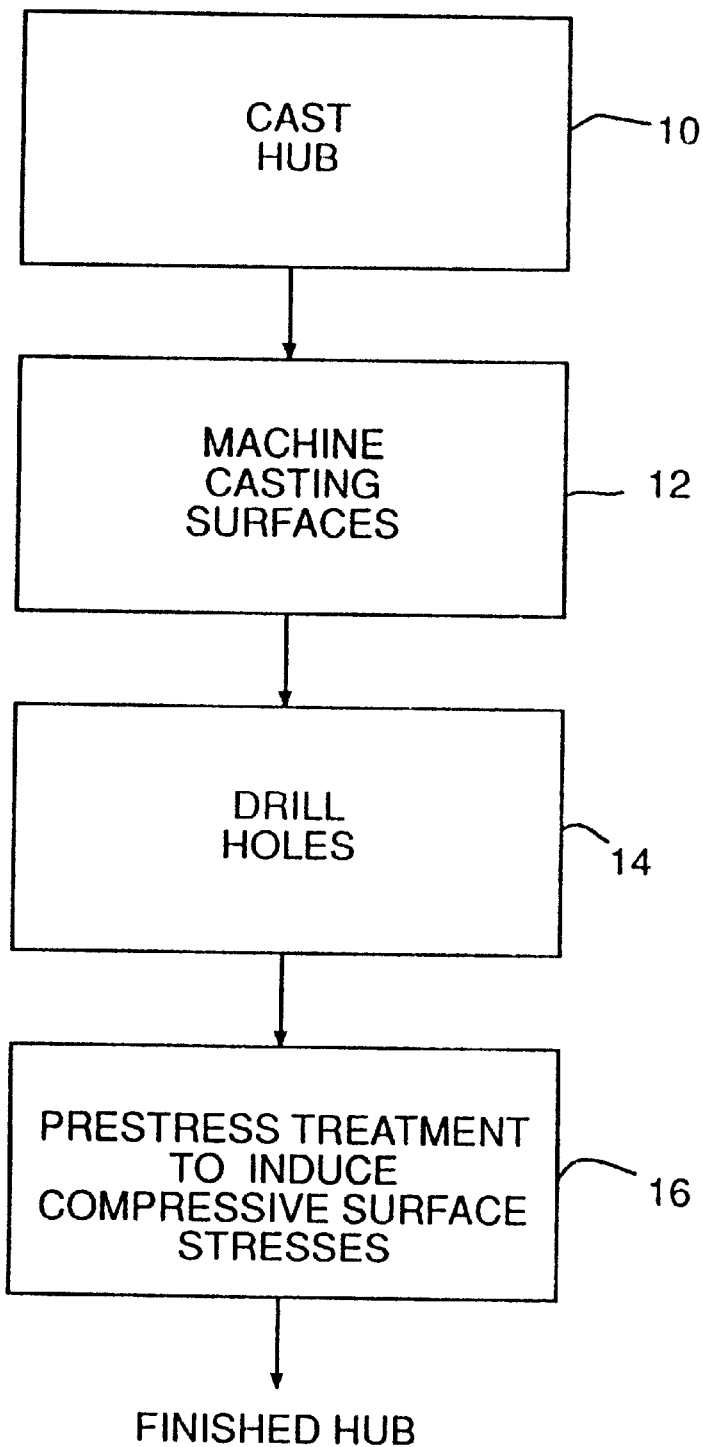
FIG. 1 is a block diagram illustrating a sequence of steps for producing an improved ductile iron vehicle hub in accordance with this invention.
Figure 2:
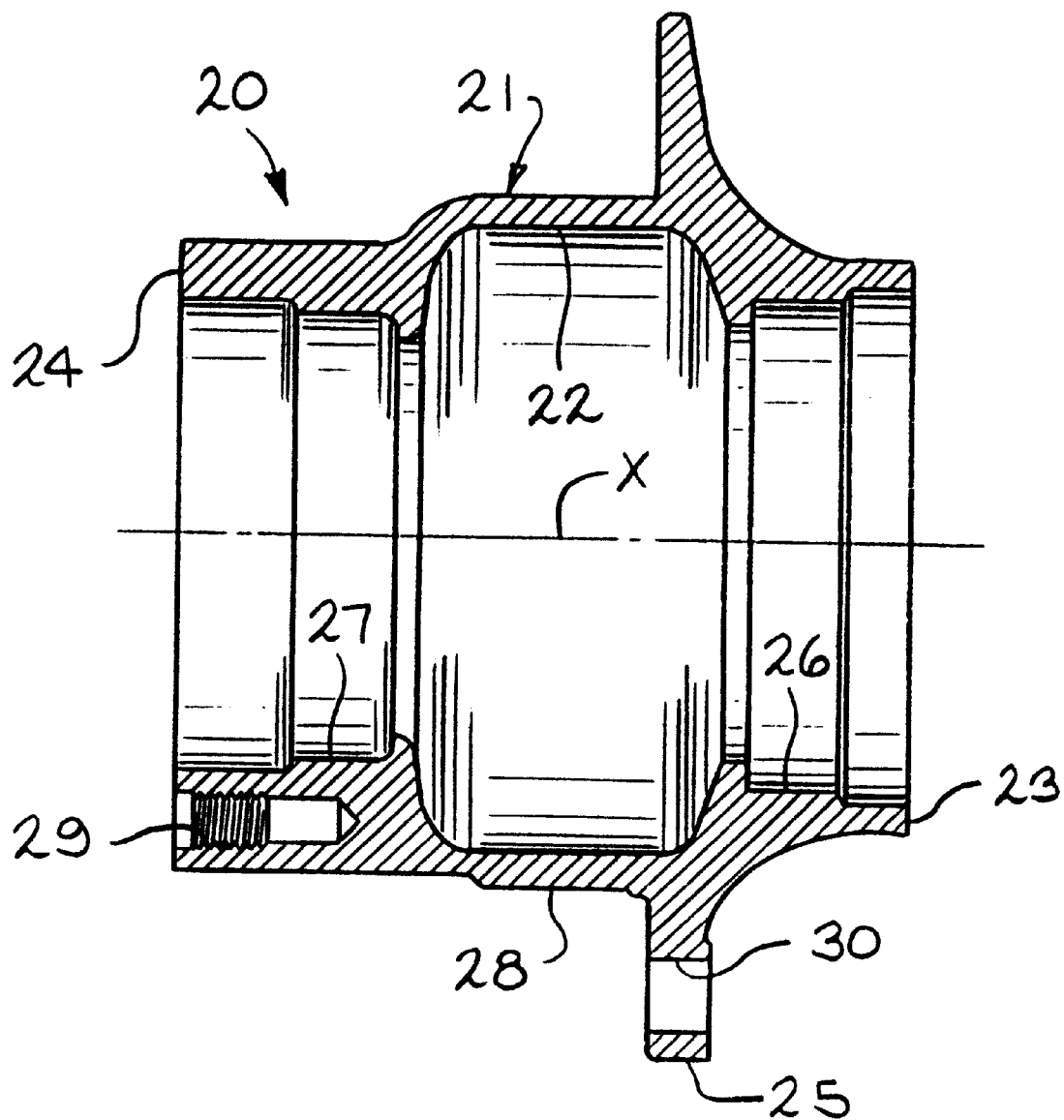
FIG. 2 is a sectional view of the ductile iron vehicle hub produced according to the process of FIG. 1.
Figure 3:
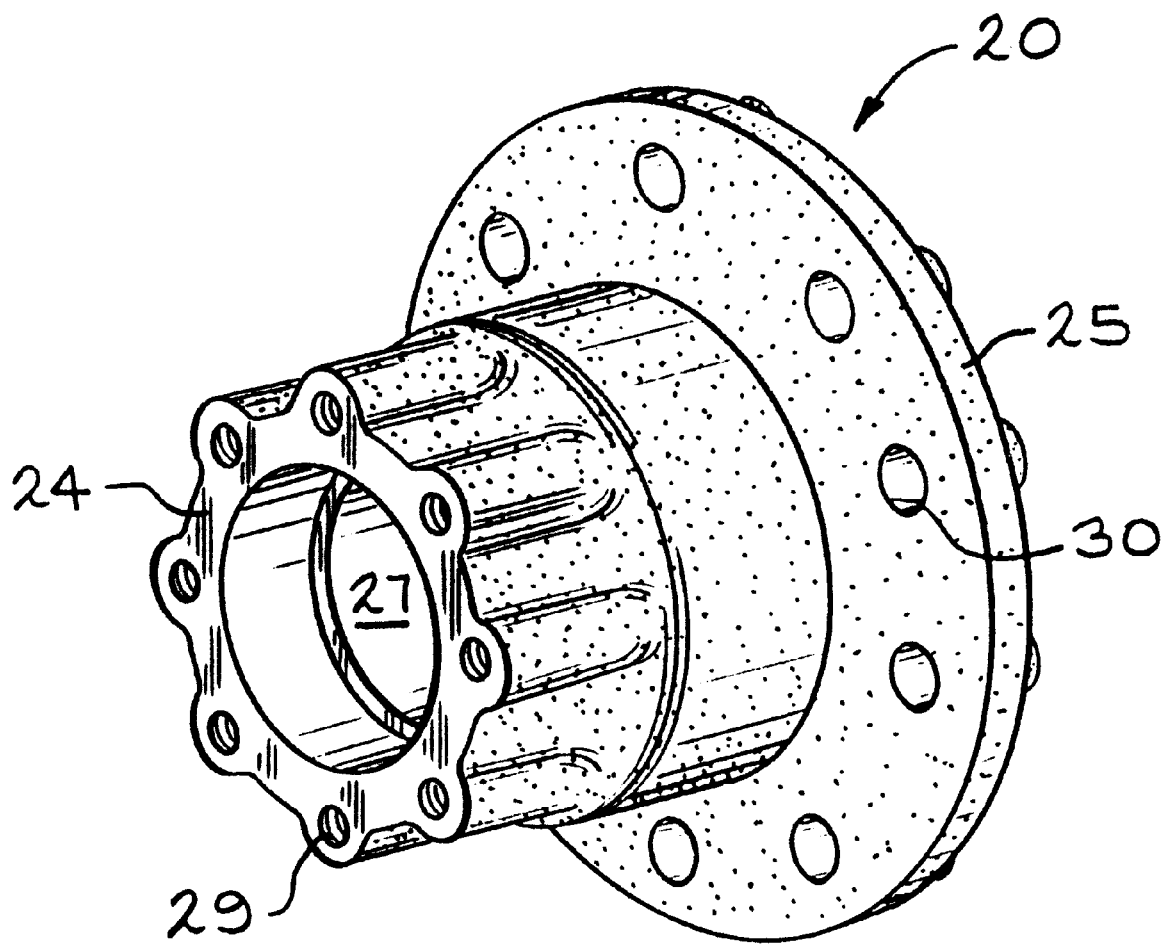
FIG. 3 is a sectional perspective view of the ductile iron vehicle hub of this invention.

Referring now to the drawings, there is illustrated in FIG. 1 the sequence of steps for producing a vehicle hub, indicated generally at 20 in FIGS. 2 and 3, in accordance with this invention. The illustrated vehicle hub 20 is adapted for use on a hub piloted outboard rear vehicle hub and brake drum assembly of a heavy duty truck or tractor, indicated generally at 50 in FIG. 4. However, it will be appreciated that the vehicle hub 20 of this invention disclosed herein can be used in conjunction with other types of vehicle hubs, and/or other kinds of vehicle wheels, and/or other kinds of disc and drum brake assemblies. For example, the vehicle hub 20 of this invention can be used in connection with a stud piloted inboard rear vehicle hub and hat-shaped brake rotor assembly, indicated generally at 52 in FIG. 5.

As shown in FIG. 1, the vehicle hub 20 is formed from ductile cast iron and is cast in step 10 using a conventional casting process, such as for example, a sand casting process. The vehicle hub 20 defines a hub axis X and includes a generally axially extending body 21 having a centrally located opening 22 formed therethrough to allow an axle spindle (not shown) to extend therethrough. The body 21 includes an open inner end 23, an open outer end 24, and a radially outwardly extending flange 25. The opening 22 of the body 21 is provided with an inner bearing seat 26 and an outer bearing seat 27. The outer bearing seat 27 is adapted to receive an outer bearing 40, and the inner bearing seat 26 is adapted to receive an inner bearing 41 for rotatably supporting the axle spindle. In this embodiment, the body 21 further includes a hub pilot surface 28 for an associated brake drum 33 and a dual wheel assembly 34.

Following step 10, selected surfaces of the vehicle hub 20 are machined in step 12 to predetermined tolerances. Typically, the surfaces of the vehicle hub 20 which are machined are the bearing seat surfaces 26 and 27, the flange 25, and in the case of the hub piloted brake drum assembly, the hub pilot surface 28.

Figure 4:
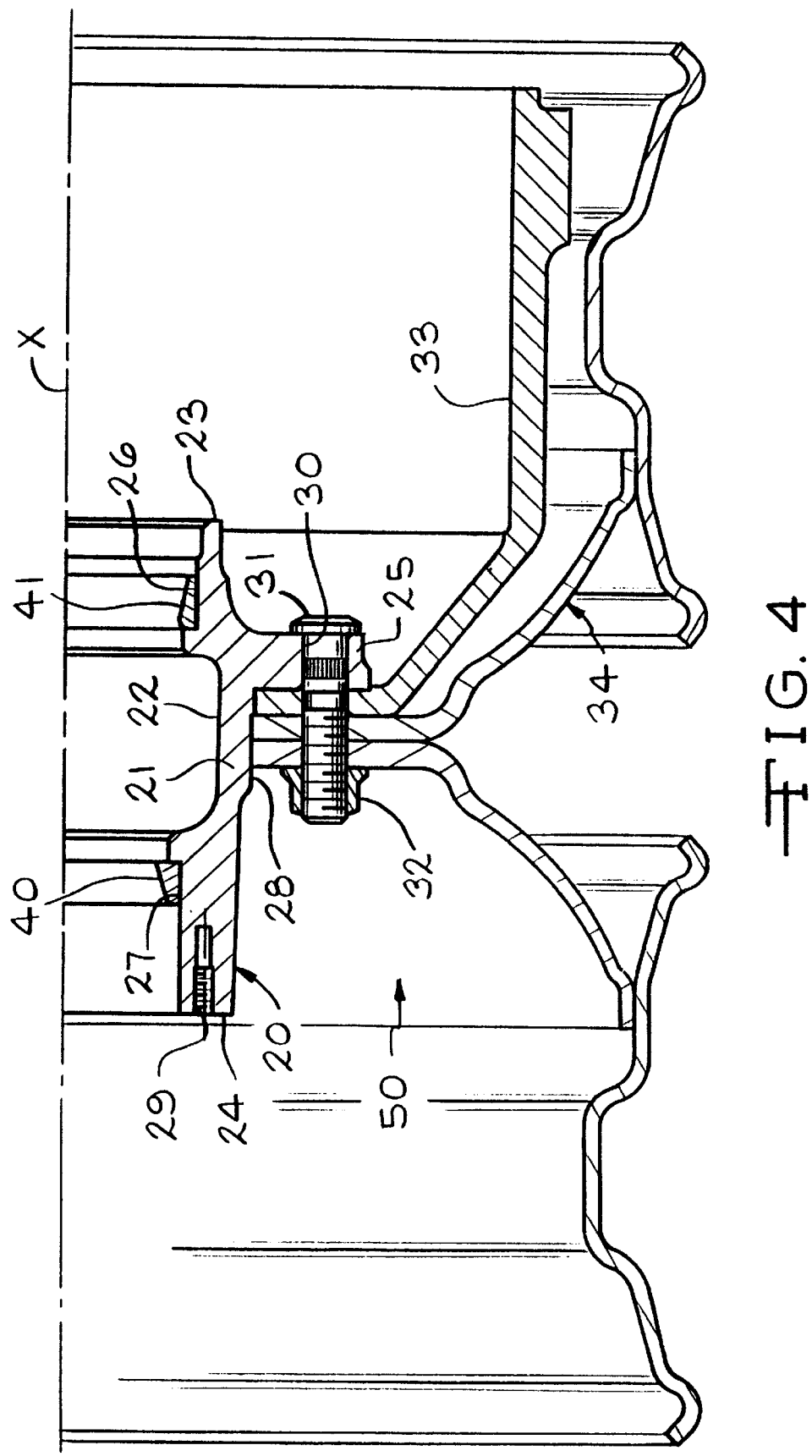
FIG. 4 is a sectional view of a portion of an outboard rear vehicle hub and brake drum assembly including the ductile iron vehicle hub of this invention.
Figure 5:
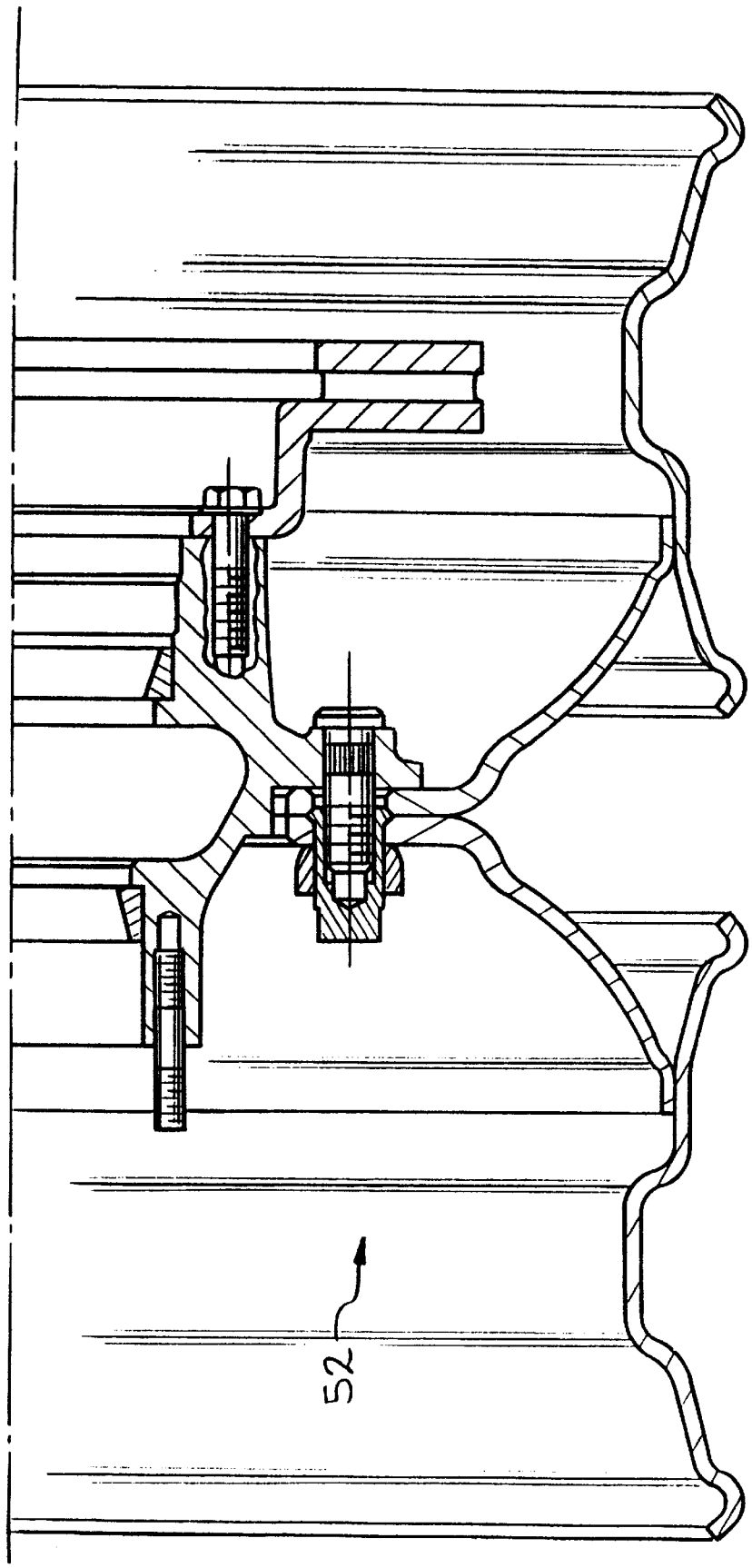
FIG. 5 is a sectional view of an inboard rear vehicle hub and hat-shaped brake rotor assembly including an alternate embodiment of a ductile iron vehicle hub produced according to this invention.

In step 14, a plurality of threaded apertures 29 (eight apertures 29 illustrated in FIG. 3), are formed in the open outer end 24 of the hub 20. The threaded apertures 29 are adapted to receive threaded fasteners (not shown) which are used to secure a hub cap (not shown) on the outer end 24 of the vehicle hub 20. Also, during step 14, a plurality of non-threaded lug bolt receiving apertures 30 (seven of such non-threaded apertures 30 illustrated in FIG. 3), are formed in the flange 25 of the vehicle hub 20. As shown in FIG. 4, a lug bolt 31 is provided and extends through each of the non-threaded apertures 30 formed in the flange 25 of the vehicle hub 20. A nut 32 is installed on a threaded end of the lug bolts 31 to the brake drum 33 and the dual wheel assembly 34 to the vehicle hub 20 for rotation therewith. The fabrication of the vehicle hub 20 thus far described has followed conventional steps.

In accordance with this invention, in step 16 selected surfaces of the vehicle hub 20 are subjected to a shot peening process in order to induce compressive stresses in these surfaces. Generally, the shot peening process is applied to selected outer surfaces the vehicle hub 20. Thus, the outer surfaces of the body 21 and the flange 25 are shot peened in step 16. Alternatively, the shot peening process in step 16 can be applied to other outer surfaces of the vehicle hub 20 and/or to other non-outer surfaces thereof.

During the shot peening process of step 16, a high velocity of stream of shot is directed against the selected outer surfaces of the vehicle hub 20. Upon contact with the surface, the shot produces slight rounded depressions in the surface, which are shown as dotted areas in FIG. 3. The shot stretches the surface radially and causes plastic flow of the hub material at the point of contact therewith. The effect usually extends from between 0.005 inches to 0.040 inches deep, depending upon the hardness of the hub metal, shot size, and the peening intensity. The metal beneath this outer surface layer is not plastically deformed. In the stress distribution that results from the shot peening step of 16, the selected outer surfaces of the vehicle hub 20 are induced with compressive stress which is generally parallel to the surface which improves the fatigue life of the vehicle hub 20.

The shot used in step 16 is preferably a metallic shot having a diameter in the range of between 0.007 inches (SAE S70) to 0.132 inches (SAE S1320), with a shot diameter of approximately 0.023 inches (SAE S230) to 0.078 inches (SAE S780) being a preferred shot size range. Such shot is directed at the selected outer surfaces of the vehicle hub 20 at a velocity which is effective to impart a curvature of approximately four to six thousandths of an inch, as measured on the Almen Gauge, to an Almen Test Strip. When the vehicle hub 20 is shot peened with shot in the above range at this velocity, the maximum compressive stress induced occurs between 0.003 to 0.006 inches below the selected surfaces of the vehicle hub 20 and is in the range of between 20,000 to 60,000 pounds per square inch.

The vehicle hub 20 of this invention provides several advantages over the above described prior art vehicle hubs. The vehicle hub 20 of this invention is less expensive to manufacture compared to the costs to manufacture a similar sized prior art austempered ductile iron vehicle hub, has a similar fatigue life as that of such a similar sized austempered ductile iron vehicle hub, and weighs approximately the same as such a similar sized austempered ductile vehicle iron. Also, the vehicle hub 20 of this invention weighs less than a similar sized prior art conventional ductile iron vehicle hub, and has an improved fatigue life compared to that of such a similar sized conventional ductile iron vehicle hub. In addition, the vehicle hub 20 of this invention is less expensive to manufacture compared to the costs to manufacture a similar sized prior art aluminum vehicle hub, and weighs approximately the same as such a similar sized aluminum vehicle hub.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A method for producing a vehicle hub comprising:
   (a) providing a vehicle hub formed from ductile iron and including a generally axially extending body having a centrally located opening formed therethrough; and
   (b) shot peening selected outer surfaces of the body of the vehicle hub to induce compressive stresses therein to improve the fatigue life of the vehicle hub.

2. The method defined in claim 1 wherein the body includes an open inner end, and the shot peening of step (b) includes shot peening outer surfaces of the open inner end of the body to induce compressive stresses therein.

3. The method defined in claim 1 wherein the body includes an open outer end, and the shot peening of step (b) includes shot peening outer surfaces of the open outer end of the body to induce compressive stresses therein.

4. The method defined in claim 1 wherein the body includes a generally radially outwardly extending flange, and the shot peening of step (b) includes shot peening outer surfaces of the flange of the body to induce compressive stresses therein.

5. The method defined in claim 1 wherein the body includes an open inner end, an open outer end, and a radially outwardly extending flange, and the shot peening of step (b) includes shot peening selected outer surfaces of the open inner end, the open outer end, and the flange of the vehicle hub to induce compressive stresses therein.

6. The method defined in claim 1 wherein the shot peening of step (b) includes directing shot having a diameter in the range of 0.007 inches (SAE S70) to 0.132 inches (SAE S1320) at the selected outer surfaces of the body of the vehicle hub.

7. An improved vehicle hub comprising:
   a vehicle hub formed from ductile iron and including a generally axially extending body having a centrally located opening formed therethrough, said vehicle hub having an initial fatigue life, wherein selected outer surfaces of the body of the vehicle hub are prestressed by inducing compressive stresses therein to improve the fatigue life of the vehicle hub.

8. The vehicle hub defined in claim 7 wherein said selected outer surfaces of said body of said vehicle hub are shot peened.

9. The vehicle hub defined in claim 7 wherein said body includes an open inner end, said open inner end including an outer surface which is prestressed by inducing compressive stresses therein to improve the fatigue life of the vehicle hub.

10. The vehicle hub defined in claim 7 wherein said body includes an open outer end, said open outer end including an outer surface which is prestressed by inducing compressive stresses therein to improve the fatigue life of the vehicle hub.

11. The vehicle hub defined in claim 7 wherein said body includes a generally radially extending flange, said radially extending flange including an outer surface which is prestressed by inducing compressive stresses therein to improve the fatigue life of the vehicle hub.

12. The vehicle hub defined in claim 7 wherein said body includes an open inner end, an open outer end, and a generally radially extending flange, said open inner end, said open outer end, and said flange including respective outer surfaces which are prestressed by inducing compressive stresses therein to improve the fatigue life of the vehicle hub.

* * * * *